(12) United States Patent
Kandaka et al.

(10) Patent No.: US 6,898,011 B2
(45) Date of Patent: May 24, 2005

(54) MULTI-LAYERED FILM REFLECTOR MANUFACTURING METHOD

(75) Inventors: Noriaki Kandaka, Kawasaki (JP); Masaki Yamamoto, Sendai (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/297,965

(22) PCT Filed: Feb. 26, 2002

(86) PCT No.: PCT/JP02/01712

§ 371 (c)(1), (2), (4) Date: Dec. 11, 2002

(87) PCT Pub. No.: WO02/084671

PCT Pub. Date: Oct. 24, 2002

(65) Prior Publication Data

US 2003/0147139 A1 Aug. 7, 2003

(51) Int. Cl.$^7$ .............................. G02B 1/00; G03F 9/00; G21K 5/00
(52) U.S. Cl. ........................... 359/584; 359/580; 430/5; 378/35
(58) Field of Search ................................ 359/580, 584, 359/586, 588, 589, 846; 430/5, 311, 322; 378/34, 35

(56) References Cited

U.S. PATENT DOCUMENTS

| 4,420,222 A | * 12/1983 | Bret et al. ................... 359/846 |
| 5,063,586 A | 11/1991 | Jewell et al. |
| 5,315,629 A | 5/1994 | Jewell et al. |
| 5,358,806 A | * 10/1994 | Haraichi et al. ............... 430/5 |
| 5,815,310 A | 9/1998 | Williamson |
| 6,235,434 B1 | * 5/2001 | Sweeney et al. ............... 430/5 |
| 6,319,635 B1 | * 11/2001 | Mirkarimi et al. ............. 430/5 |
| 6,335,129 B1 | * 1/2002 | Asano et al. .................. 430/5 |

FOREIGN PATENT DOCUMENTS

| JP | A-7-280999 | 10/1995 |
| JP | A-8-293450 | 11/1996 |
| JP | A-9-211332 | 8/1997 |

OTHER PUBLICATIONS

U.S. patent application Ser. No. 10/229,638, Kandaka et al., Filed Aug. 27, 2002.
U.S. patent application Ser. No. 10/241,959, Oshino, et al., Filed Sep. 11, 2002.
U.S. patent application Ser. No. 10/012,739, Shiraishi et al., Filed Oct. 19, 2001.
Tichenor et al., *Proceedings of SPIE*, vol. 2437, p. 292–307, 1995.
Montcalm et al., *Proceedings of SPIE*, vol. 3331, p. 42–51, 1998.
Born and Wolf, *Principles of Optics*, 2$^{nd}$ Revised Edition, p. 468–473, 1964.
Yamamoto, *Nuclear Instruments & Methods in Physics Research*, vol. 467–468, p. 1282–1285, 2001.
Mirkarimi et al., *Proceedings of SPIE*, vol. 3331, p. 133–148, 1998.
Shiraishi et al., *Proceedings of SPIE*, vol. 3997, p. 620–627, 2000.

* cited by examiner

*Primary Examiner*—Audrey Chang
(74) *Attorney, Agent, or Firm*—Klarquist Sparkman, LLP

(57) ABSTRACT

Methods are disclosed for manufacturing multi-layer film reflection mirrors, in which a desirable shape accuracy of a reflected wavefront can be obtained after locally scraping the multi-layer film. In an exemplary method, a multi-layer film (comprising respective alternating layers of at least two types of substances having different respective refractive indices) is superposedly formed on the surface of a mirror substrate. The multi-layer film has a constant period length, and the multi-layer film on the substrate is locally scraped to correct a phase of a reflected wavefront from the reflective surface of the mirror. The multi-layer film has an internal stress of 50 MPa or smaller. Alternatively or in addition, a compensating adjustment in a film formed on a reverse surface of the substrate can be made to cancel the stress perturbation caused by scraping of the multi-layer film on the obverse surface of the substrate.

19 Claims, 7 Drawing Sheets

MULTI-LAYERED FILM REFLECTOR MANUFACTURING METHOD

CROSS REFERENCE TO RELATED APPLICATIONS

This application is the U.S. National Stage of International Application No. PCT/JP02/01712, filed Feb. 26, 2002, which is published under PCT Article 21(2) as Publication No. WO 02/084671 and of which the instant application claims the benefit, which in turn claims the benefit of Japan Patent Application No. 2001-113195, filed Apr. 11, 2001. All these applications are incorporated herein in their entirety.

FIELD

This disclosure relates to methods for manufacturing multi-layer film reflection mirrors used in soft X-ray optical apparatus such as soft X-ray projection-exposure apparatus.

BACKGROUND

Recently, as the active elements in semiconductor integrated circuits have become smaller in size, corresponding improvements in the resolution of projection-exposure (projection-microlithography) methods used for imprinting active elements have been required. The relentless demand for achieving ever-finer pattern resolution in projection-microlithography has revealed the resolution limits (dictated by limits of light diffraction) of current projection-microlithography methods that employ deep-UV light. Consequently, substantial effort currently is underway to develop a practical projection-microlithography apparatus that employs "soft X-ray" (also termed "extreme ultraviolet" or "EUV") light having a wavelength of 11 to 14 nm. See, e.g. Tichenor, et al., *Proceedings SPIE* 2437:292(1995). As referred to herein, this new microlithography method is termed "EUV Lithography" (abbreviated EUVL). EUVL is expected to achieve a pattern resolution of 70 nm or less, which is currently impossible using conventional lithography methods (ultilizing deep-UV wavelengths of 190 nm or more).

Since the refractive indices of known materials are nearly unity (1.00) in the EUV wavelength band, ordinary optical elements for refraction or reflection cannot by employed. Instead, grazing-incidence mirrors can be used that exploit total reflection from a surface of a material having a refractive index slightly less than 1. Alternatively, multi-layer-film reflection mirrors can be used in which weak rays of EUV light are reflected from the interfaces of multiple, superposed thin layers formed on the surface of a mirror substrate. The reflections from the interfaces are in phase with each other and cooperate to yield a summed high reflectivity. An exemplary conventional multi-layer-film reflection mirror has a surficial multi-layer film that comprises alternating layers of molybdenum (Mo) and silicon (Si). Such a multi-layer film exhibits a reflectivity of 67.5% at a wavelength band in the vicinity of 13.4 nm for perpendicular incidence. Another conventional multi-layer-film mirror has a multi-layer film that comprises alternating layers of Mo and beryllium (Be). Such a multi-layer film exhibits a reflectivity of 70.2% at a wavelength band in the vicinity of 11.3 nm for perpendicular incidence. See e.g., Montcalm, *Proceedings SPIE* 3331:42(1998).

A conventional EUVL apparatus comprises a soft X-ray source, an illumination-optical system, a mask stage, a focusing—optical system (projection-optical system), and a wafer stage. The soft X-ray source can be a laser-plasma light source, a discharge-plasma light source, a synchotrom-radiation light source, or the like. The illumination-optical system typically comprise multiple grazing-incidence mirrors that reflect a beam of soft X—ray light incident on the reflective surfaces of the mirrors from an oblique direction. The illumination-optical system also comprises one or more multi-layer film reflection mirrors as summarized above and a filter that transmits a soft X-ray beam having a predetermined wavelength. Soft X-ray light passing through the filter illuminated a photomask (reticle) that usually defines a pattern to be transferred to the wafer (lithographic substrate). Since substances that are transparent to soft X-ray light are currently unknown, the photomask must be a reflective mask rather than a transmissive photomask as used in conventional projection-microlithography. The pattern (e.g., for a circuit layer) defined on the reflective photomask is projected and focused onto the surface of a wafer or other suitable substrate, coated with a photoresist, by the focusing-optical system. To such end, the focusing-optical system comprises a plurality of multi-layer-film reflection mirrors. Since soft X-ray light is absorbed and attenuated in the atmosphere, all portions of the apparatus in which soft X-ray light is propagated are maintained at a predetermined vacuum (e.g., less than $1 \times 10^{-5}$ Torr).

In the focusing—optical system, since the reflectivity of each of the multi-layer-film reflection mirrors is not 100%, it is desirable to minimize the number of multi-layer-film reflection mirrors so as to minimize the loss of light flux passing through the focusing-optical system. One exemplary conventional focusing-optical system comprises 4 multi-layer-film reflection mirrors (Jewell et al., U.S. Pat. No. 5,315,629; Jewell, U.S. Pat. No. 5,063,586). Another conventional focusing-optical system comprises 6 multi-layer-film reflection mirrors (Williamson, Japan Unexamined Patent Application No. Hei 9-211332; U.S. Pat. No. 5,815, 310). Unlike a refractive optical system through which the luminous flux (pencil of rays) travels in one direction, reflective optical systems through which the luminous flux travels back and forth from one mirror to the next require that steps be taken to prevent shading the luminous flux by any of the mirrors. This constraint can make it difficult to increase the numerical aperture (NA) of the optical system. Conventional 4-mirror optical systems exhibit an NA of 0.015, and conventional 6-mirror optical systems have been made that exhibit a larger NA. Generally, the number of multi-layer-film mirrors is an even number to allow the mask stage and wafer stage to be situated on opposite sides of the focusing—optical system.

To provide satisfactory correction of aberrations in these reflective optical systems while using a limited number of multi-layer-film mirrors the surface of each of the multi-layer-film mirrors is machined to have an aspherical profile. Also, the illumination field is usually configured as a ring-field so as to provide aberration correction only near a predetermined image height. To transfer the entire pattern from the photomask to the wafer, exposure is carried out with the mask stage and wafer stage being scanned at certain respective velocities determined by the magnification of the focusing-optical system.

The focusing—optical system is a so—called a diffraction-limited optical system of which wave aberrations must be adequately reduced in order to obtain satisfactory performance from the system. An exemplary performance standard is an RMS (root means square) wave aberration no greater than $\lambda/14$, wherein $\lambda$ is the wavelength of soft X-ray light with which the system is used. See, Born and Wolf, *Principles of Optics*, 4th edition, Pergamon Press, p. 469

(1970). This is a condition at which Strehl intensity (a ratio of a maximum point intensity of an optical system exhibiting an aberration, compared to a stigmatic optical system) is 80% or greater. From practical standpoint, the focusing-optical system should exhibit an aberration of less than $\lambda/14$.

EUVL technology developed recently mainly utilizes a soft X-ray wavelength in the vicinity of 13 nm or 11 nm. The figure error (FE) allowable for each of the multi-layer-film reflection mirrors in the focusing-optical system is expressed as follows, as a function of wavefront error (WFE):

$$FE = WFE/2/\sqrt{m} \ (RMS)$$

where m is the number of reflection mirrors in the optical system. The divisor of 2 reflects the fact that an error of 2 times the figure error is added to the wavefront error because both incident light and reflected light are affected by the figure error. Finally, in a diffraction-limited optical system, the figure error (FE) allowable for each reflection mirror is expressed by the following equation, where $\lambda$ is the wavelength and m is the number of reflection mirrors:

$$FE = \lambda/28/\sqrt{m} \ (RMS)$$

The FE at a wavelength of 13 nm is 0.23 nm (RMS) in the case of an optical system comprising four reflection mirrors, and is 0.19 nm (RMS) in the case of an optical system comprising six reflection mirrors.

It is very difficult to manufacture aspheric reflection mirrors having such high precision, which is the main reason why EUVL currently is not in practical use. Although the machining accuracy for an aspheric surface currently achievable is about 0.4 and 0.5 nm RMS (see Gwyn, *Extreme Ultraviolet Lithography White Paper*, EUVLLC, p. 17 (1998)), further improvements in the machining technique (and in measurement techniques) for aspherical surfaces are required to realize a practical EUVL apparatus.

Recently, Yamamoto reported a break-through technique that achieves sub-nm correction of the figure error of a multi-layer-film reflection mirror by scraping one or more individual layers from a selected region on the surface of the multi-layer-film reflection mirror. Yamamoto, *7th International Conference on Synchrotron Radiation Instrumentation*, Berlin, Germany, POS 2–189, Aug. 21–25, 2000. The principle of this scraping technique is explained with reference to FIGS., 8A–8B, depicting a mirror of which the multi-layer-film is made of respective layers of two types of substances, A and B, wherein the layers are deposited alternatingly in a superposed manner, with a period length of d (FIG. 8A). To achieve correction, at least one layer pair is scraped off in a selected region, as shown in FIG. 8B. In FIG. 8A, the optical-path length of one layer pair having a combined thickness of d along a light-beam trajectory that is perpendicularly incident to the surface of the multi-layer film is expressed by $OP = n_A d_A + n_B d_B$, wherein $d_A$ and $d_B$ are the respective thickness of layers A and B, respectively, and $d_A = d_B = d$. Also, $n_A$ and $n_B$ are the respective refractive indices of the substances A and B. As shown in FIG. 8B, the optical-path length of a region having a thickness of d, in which one layer pair is scraped from the uppermost surface of the multi-layer-film, is expressed by $OP' = nd$, wherein n is the refractive index in vacuum (n=1). Accordingly, the optical-path length of a light beam incident to the scraped region is varied by scraping one or more of the uppermost layers from the multi-layer film. This is optically equivalent to modifying the surface shape of the multi-layer film by varying the optical-path length. The variation in the optical-path length (i.e., the variation in surface shape) is expressed by $\Delta = OP' - OP$. Since the refractive index of known substances is essentially unity (1) in the wavelength band of soft X-rays, $\Delta$ has a small value. Consequently, the surface shape can be precisely corrected using this method. For instance, consider a multi-layer-film mirror comprising alternating layers of Mo and Si, used at a wavelength of 13.4 nm. For perpendicular incidence, d=6.8 nm, $d_{Mo}$=2.3 nm, and $d_{Si}$=4.5 nm. In this wavelength band, the refractive index ($n_{Mo}$) of Mo is 0,92 and the refractive index ($N_{Si}$) of Si is 0.998. Calculating the variation in optical-path length using these values, OP is 6.6 nm, OP' is6.8 nm, and $\Delta$ is 0.2 nm. By scraping one layer pair having a thickness of 6.8 nm the surface shape can be modified within an accuracy of 0.2 nm. Incidentally, in the case of Mo/Si multi-layer film, since the refractive index of the Si layer is nearly 1, the variation in the optical-path length is mainly dependent on the existence or non-existence of the Mo layer and thus is independent of the existence or non-existence of the Si layer. Accordingly, while scraping the uppermost layer from the multi-layer film it is unnecessary to control the thickness of the Si layer precisely. In this case, the thickness of the Si layer is 4.5 nm, and scraping can be stopped at any depth through the Si layer. In other words, processing at an accuracy of several nm yields a correction of the surface within about 0.2 nm.

From a practical perspective, a reflective wavefront produced by a multi-layer-film mirror is measured after forming the multi-layer film. Reflectivity reaches a maximum ("saturates") at a particular number of layers, and exhibits no further increase with additional layers. Whenever the number of layers is sufficient to achieve a saturated reflectivity, reflectivity does not change even if one or several layers of the multi-layer film are scraped away.

In general, a multi-layer film has a certain internal stress. Consequently, a Mo/Si multi-layer film or a Mo/Be multi-layer film used on an EUVL reflection mirror tends to exhibit a certain internal stress. For instance, it has been reported that a Mo/Si multi-layer film has a compressive stress of about –450 MPa, and a Mo/Be multi-layer film has a tensile stress of about +400 MPa. Mirkarimi et al., *Proceedings SPIE* 3331:133–148 (1998). In EUVL, the internal stress in a multi-layer film of a mirror in the focusing-optical system can substantially influence the shape of the substrate surface on which the multi-layer film is formed.

As described above, the shape accuracy required of the reflection mirrors used in the focusing-optical system used for EUVL is 0.23 to 0.19 nm RMS or less. Even if the mirror substrate for such a mirror can be processed to have sluch an accurately formed surface shape, whenever a conventional Mo/Si multi-layer film or Mo/Be multi-layer film is formed on the shaped surface of the mirror substrate, the shaped surface of the substrate tends to be deformed due to the internal stress imposed by the multi-layer film. The magnitude of the deformation caused in this manner can substantially exceed the required shape accuracy.

For instance consider at Mo/Si multi-layer film (having a period length d=7.0 nm, $\Gamma$=0.35, and 50 layer pairs) exhibiting an internal stress of –400 MPa formed on a surface of a mirror substrate having a diameter of 200 mm and a thickness of 40 mm. Such a film can cause a substrate-surface deformation that exceeds 20 nm. (Here $\Gamma$ is the ratio of the thickness of the layer of material exhibiting higher refractivity, relative to the period length. In this instance $\Gamma$ is the ratio of thickness of a Mo layer to the period length of 7.0 nm.) The influence of the component, among the possible deformation components, causing the variation in the radius of curvature of the mirror substrate can be modulated by adjusting the distance between adjacent mirrors of the optical system while minimizing any adverse influence on imaging performance. However, it is impossible to modulate the distance between mirrors sufficiently to achieve a deformation component of 1 nm or more without substantially influencing the optical characteristics of the EUVL optical system. Hence, according to conventional thinking, the absolute value of stress in an multi-layer film should be suppressed to less than 50 MPa.

In order to solve this stress problem, methods for stress reduction in the multi-layer film have been proposed. One method involves forming a multi-layer-film unit configured as a Mo/Ru/Mo/Si multi-layer film rather than the conventional Mo/Si structure. After forming each Mo layer, an ion beam is irradiated on the surface of the newly formed Mo layer (Shiraishi et al., *Proceeedings SPIE* 3997:620–627 (2000)), and the substrate is heated while forming the film layers. The Shiraishi method yields a reduction to +14 MPa tensile stress in the multi-layer film.

In another method, a Mo/Be multi-layer film having a certain tensile stress is pre-formed in order to cancel the deformation caused by compressive stress in a Mo/Si multi-layer film, which results in a cancellation of stress after forming the multi-layer-film (Mirkarimi et al., *Proceedings SPIE* 3331:133–148 (1998)). In this method a multi-layer film is formed on a back surface of the mirror substrate to cancel the deformations in the multi-layer film formed on the "front" surface. Based on the deformation of the substrate caused by the stress of the multi-layer film on the front surface, the substrate is machined to a have a shape predicted as a target shape after the deformation caused by the multi-layer film on the front surface Although the method for controlling the reflected wavefront proposed by Yamamoto et al. is useful, locally scraping the multi-layer film causes the thickness of the multi-layer film to become uneven on the surface of the mirror substrate. As described above, since most multi-layer films have internal stresses of about several hundred MPa in general, if a multi-layer film is locally scraped, the total stress (stress× thickness) in the multi-layer film before commencing scraping is different from the total stress after completing scraping. This change in stress causes a deformation in the substrate.

A conventional method for controlling the reflected wavefront by scraping the multi-layer film is shown in FIGS. 9A–9C. As shown in FIG. 9A, respective Mo/Si multi-layer films 91 and 95 are formed on the front and rear surfaces, respectively of a planar mirror substrate 93. As a result of forming the multi-layer films on both surfaces of the mirror substrate, the deformation caused by stress of the multi-layer film on one surface of the substrate is canceled by the deformation caused by the stress of the multi-layer film on the other surface of the substrate. Thus, the substrate shape is maintained as planar. Each Mo/Si multi-layer film is composed of 50 layer pairs having a period length d=6.8 nm, Γ=0.35, topped off with 10 layer pairs having d=6.8 nm and Γ=0.1. The multi-layer film is formed by ion-beam sputtering. Here Γ is the ratio of the Mo layer thickness to d. The upper 10 layer pairs, having Γ=0.1, serve to improve the accuracy with which the wavefront can be controlled by scraping layers. By scraping one layer pair from the surface of this multi-layer film, the optical-path length is lengthened by 0.5 nm, causing a corresponding delay of 0.1 nm in the reflected wavefront at both incidence and reflection (see above). As shown in FIG. 9B, scraping a region 97 from the multi-layer film allows the shape of the reflected wavefront to be controlled with high accuracy by adjusting the amount actually scraped away from the reflective surface. However, since the Mo/SI multi-layer film exhibits a compressive stress of −450 MPa, the thickness of the multi-layer film undergoing scraping becomes uneven. This causes the balance of a total stress (stress×thickness) on both surfaces of the substrate to the perturbed, which causes the shape of the substrate to become uneven, as shown in FIG. 9C. If a part of the Mo/Si multi-layer film is scraped off, the scraped film has a compressive stress; hence, the portion undergoing scraping is deformed to concave. As a result, the reflective surface exhibits a further delay to the wavefront by an amount that is greater than predicted by the actual scraping, which prevents the wavefront from being controlled with a desired accuracy.

The shape of the wavefront after locally scraping the multi-layer film depends not only on the change in the optical-path length of the reflective light actually caused by the scraping, as described above, but also on the deformation of the substrate caused by the resulting unevenness of the total stress of the multi-layer film. Accordingly, in order to achieve a desired accuracy in the shape of the reflected wavefront by locally scraping the multi-layer film, it is no longer sufficient simply to determine the scraping amount based on the change in the optical-path length of the reflected light by only scraping the multi-layer film.

SUMMARY

The shortcomings of conventional methods as summarized above are addressed by various aspects of the present invention described below. Hence, the instant invention facilitates obtaining a desired reflection wavefront after scraping the multi-layer film of a multi-layer-film mirror.

According to one aspect, methods are provided for manufacturing a multi-layer-film reflection mirror. In an embodiment of such a method, a multi-layer film is formed on the surface of a substrate. The multi-layer film comprises at least two types of substances having different respective refractive indices. The individual layers are superposedly deposited on the surface of the substrate in an alternating manner, with a constant period length. The multi-layer film is locally scraped as required in order to correct the phase of a reflected wavefront from the reflective surface of the mirror. The multi-layer film has an internal stress of 50 MPa or less.

By way of example, the multi-layer film can be configured as a Mo/Ru/Mo/Si multi-layer film. In this instance, each Mo layer is irradiated with an ion beam after forming the layer.

By configuring the multi-layer film that is locally scraped to have an internal stress of 50 MPa or less, the change in total stress (stress×thickness) due to the scraping can be decreased. This allows the reflected wavefront to be controlled with higher accuracy after scraping the multi-layer film.

In another embodiment for manufacturing a multi-layer film is formed of respective layers of at least two types of substances having different respective refractive indices. The layers are formed superposedly in an alternating manner on the obverse ("front") surface of the substrate, with a constant period length. The multi-layer film is locally scraped as required to correct the phase of a wavefront reflected from the reflective surface of the mirror (the surface of the multi-layer film). A film or a multi-layer film is formed on the reverse ("rear") surface of the substrate to produce a countervailing deformation of the substrate that serves to cancel deformation of the substrate caused by scraping the multi-layer film on the obverse surface. By forming the film on the reverse surface of the substrate, the shape of the substrate can be maintained as it was prior to scraping the multi-layer film on the obverse surface. As a result, the reflected wavefront is controlled with higher accuracy after scraping the multi-layer film.

In another embodiment, a first multi-layer film (comprising at least two types of substances having different respective refractive indices) is formed on the obverse surface of the substrate. The layers are formed superposedly in an alternating manner at a constant period length to form a reflective surface. The first multi-layer film is locally scraped to correct the phase of a wavefront reflected from the reflective surface. A second multi-layer film having approximately the same structure as the first multi-layer film is formed on the reverse surface of the substrate. The second multi-layer film is locally scraped at regions corresponding to respective scraped regions on the first multi-layer film, in order to correct the phase of the reflected wavefront with the same thickness as the thickness of the scraped multi-layer film on the obverse surface of the substrate. In this method, the total respective stresses on both surfaces of the substrate are canceled so that the shape of the substrate is maintained at the pre-scraping shape. As a result, the reflected wavefront is controlled with high accuracy after scraping the multi-layer film.

In yet another method embodiment, a multi-layer film comprising at least two types of substances having different respective refractive indices is formed on an obverse surface of a mirror substrate. The constituent layers are superposedly formed in an alternating manner with a constant period length to form a reflective surface. The multi-layer film is locally scraped to correct the phase of a reflected wavefront from the reflective surface. The amount of material of the multi-layer film removed by scraping is determined based on a determined influence on substrate deformation caused by scraping the multi-layer film. By determining the scraping amount in this manner, the reflected wavefront can be controlled with high accuracy after scraping.

In yet another method embodiment, a multi-layer film formed of at least two types of substances having different respective refractive indices is formed on the surface of a mirror substrate. The constituent layers are superposedly formed in an alternating manner with a constant period length to form a reflective surface. The multi-layer film is locally scraped to correct the phase of reflected wavefront as modified by the deformation of the substrate caused by scraping the multi-layer film and a phase of the reflected wavefront modified by locally scraping the multi-layer film, is equal to a desired correction amount. By determining the scraping amount in this manner, the reflected wavefront can be controlled with high accuracy after scraping the multi-layer film.

In any of the foregoing methods, the multi-layer film can comprise, for example, multiple alternating layers of a substance comprising Mo and a substance comprising Si. Such a multi-layer reflection mirror is suitable for use in a wavelength band of 12.5 nm to 14 nm. If desired, a layer of a substance comprising Si can be formed on the reflective surface to prevent oxidation of the top-most layer of the multi-layer film. As a result, the reflected wavefront can be controlled with high accuracy after scraping the multi-layer film while preventing changes in the characteristics of the reflection mirror due to oxidation.

The foregoing and additional features and advantages of the invention will be more readily apparent from the following detailed description, which proceeds with reference to the accompanying drawings.

DETAILED DESCRIPTION

The description is set forth with reference to the drawings, which are schematic in form and do not accurately depict, for example, the ratio of thickness of the mirror substrate to the period length of the multi-layer film formed on the substrate, or the scraping amounts of material removed from the multi-layer film.

Figure 1A:
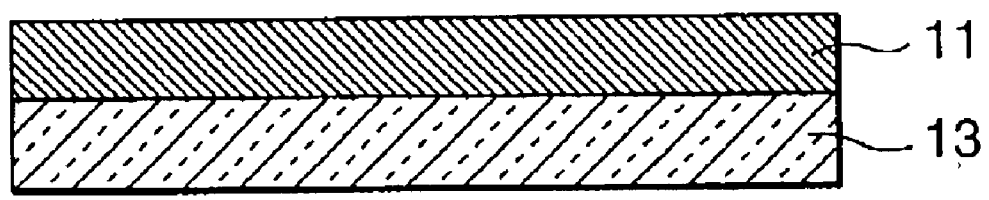
FIGS. 1A and 1B are respective elevational sections depicting the results of respective steps in a manufacturing process for a multi-layer-film reflection mirror according to a first representative embodiment.
Figure 1B:
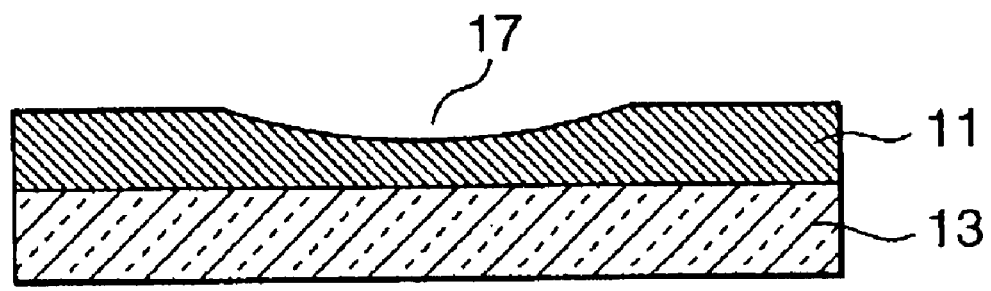

Referring first to the embodiment shown in FIGS. 1A–1B, a Mo/Ru/Mo/Si multi-layer film 11 is formed on a planar mirror substrate 13. The multi-layer film 11 is composed of two types of substances (i.e., a first substance comprising Mo/Ru/Mo and a second substance comprising Si) having different respective refractive indices. The layers are formed superposedly in an alternating manner, with a constant period length. While forming the multi-layer film, an ion beam is irradiated after forming each Mo layer.

The multi-layer film 11 has an internal stress of +14 MPa, which is about 1/30 the internal stress of a conventional multi-layer film (which has an internal compressive stress of −450 MPa). As a result, the deformation of the substrate 13 caused by a formed multi-layer film is so small that the shape of the substrate remains substantially unchanged (in this case planar) even after forming the multi-layer film.

Figure 9A:
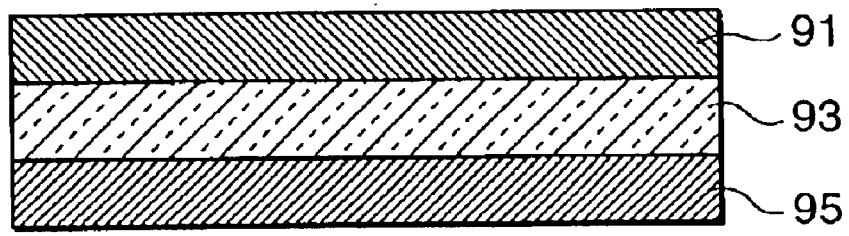
FIGS. 9A–9C are respective elevational sections depicting a conventional method for controlling the reflected wavefront by scraping a multi-layer film.
Figure 9B:
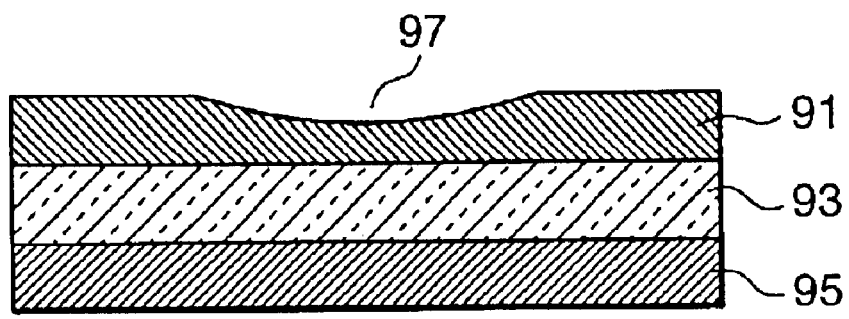
Figure 9C:
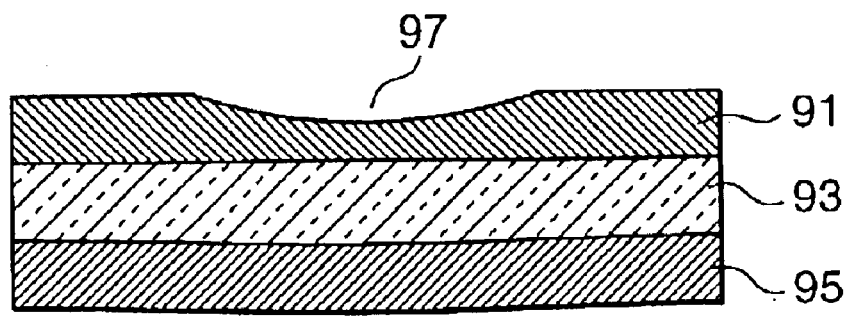

The Mo/Ru/Mo/Si multi-layer 11 comprises 50 layer pairs, with a period length d=6.8 nm and $\Gamma$=0.35, topped off with 10 layer pairs having a period length d=6.8 nm and $\Gamma$=0.1. The multi-layer film 11 is formed by ion-beam sputtering. As described above, $\Gamma$ is a division ratio of a layer structural unit, and represents the ratio of thickness of the substance having larger absorbance to the period length. In this instance, $\Gamma$ is the ratio of the sum of thickness of Mo layer and the thickness of a Ru layer to the period length. The 10 layer pairs having Γ=0.1 are formed as a top-most layer structure so as to improve control of the accuracy with which the wavefront can be controlled by scraping of the multi-layer film (see FIGS. 9A–9C). Since the optical constants of Mo and Ru with respect to a wavelength in the vicinity of 13 nm are nearly equal to each other, the effect of controlling the wavefront by scraping the Mo/Ru/Mo/Si multi-layer film is similar to the effect realized by scraping a Mo/Si multi-layer film. By scraping one layer pair from the multi-layer film, the optical path length is lengthened by 0.05 nm, so the reflected wavefront is delayed by 0.1 nm at both incidence and reflection. Therefore, as shown in FIG. 1B, by removing a region 17 of the multi-layer film, it is possible to control the shape of the reflected wavefront with high accuracy by adjusting the scraping amount removed from the reflective surface. In addition, the stress of the Mo/Ry/Mo/Si multi-layer film is so small that the shape of the substrate is not deformed by local changes in stress caused by scraping. As a result, the substrate 13 is maintained in a planar configuration even after completing scraping. Thus in this embodiment, locally scraping the multi-layer film yields good control of the reflected wavefront while maintaining the shape of the reflected wavefront with high accuracy.

Figure 2A:
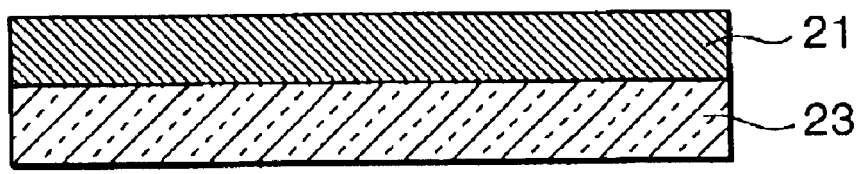
FIGS. 2A–2C are respective elevational sections depicting the results of respective steps in a manufacturing process for a multi-layer-film reflection mirror according to a second representative embodiment.
Figure 2B:
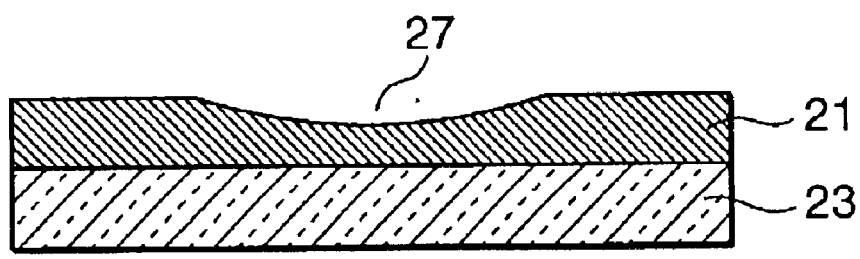
Figure 2C:
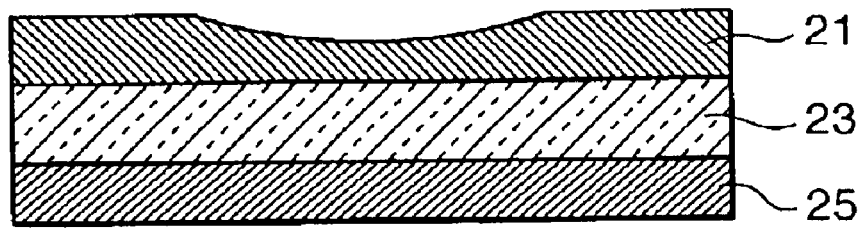

Turning now to the embodiment shown in FIGS. 2A–2C, a substrate 23 is shown on which is Mo/Si multi-layer film 21 is formed on an obverse surface of the substrate. A portion of the multi-layer film 21 is removed, by scraping, from a region 27 in order to control the wavefront of light reflected from the mirror. The multi-layer film 21 has a compressive stress. Consequently, the region of the substrate 23 corresponding to the scraped region 27 exhibits a concave deformation after completing the scraping. To cancel this deformation of the substrate, a second multi-layer film 25 is formed on the reverse surface of the substrate 23. The second multi-layer film produces a countervailing deformation of the substrate 23 that effectively cancels the substrate deformation caused by scraping (FIG. 2C). Thus, the shape of the substrate 23 is maintained, despite the scraping, as it was before commencing scraping.

Whereas the multi-layer film 21 in this embodiment is formed on one surface of the substrate 23, this embodiment also is applicable to situations in which multi-layer films are formed on both surfaces of the substrate. Also, whereas in this embodiment a multi-layer film 25 is formed on the reverse surface of the substrate, the film formed on the reverse surface alternatively can be a single-layer film if the distribution of total stress in the surface is approximately similar to that on a surface.

Figure 3A:
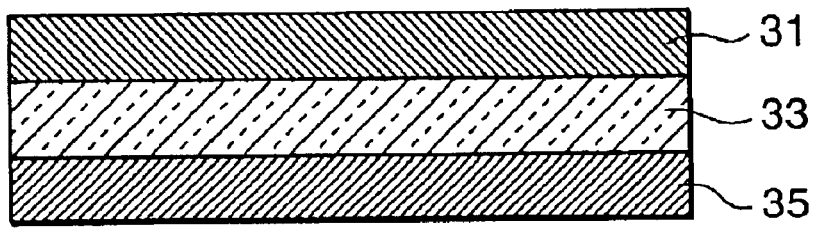
FIGS. 3A–3C are respective elevational sections depicting the results of respective steps in a manufacturing process for a multi-layer-film reflection mirror according to a third representative embodiment.
Figure 3B:
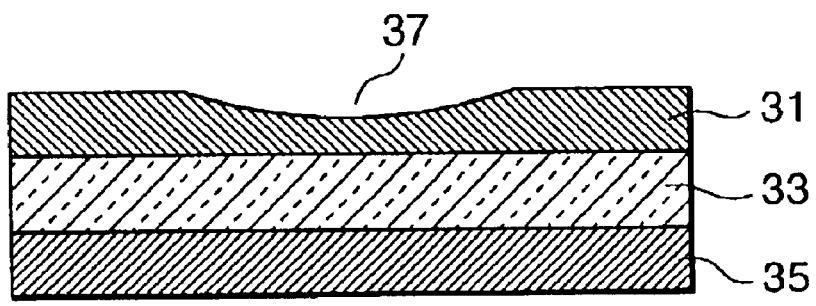
Figure 3C:
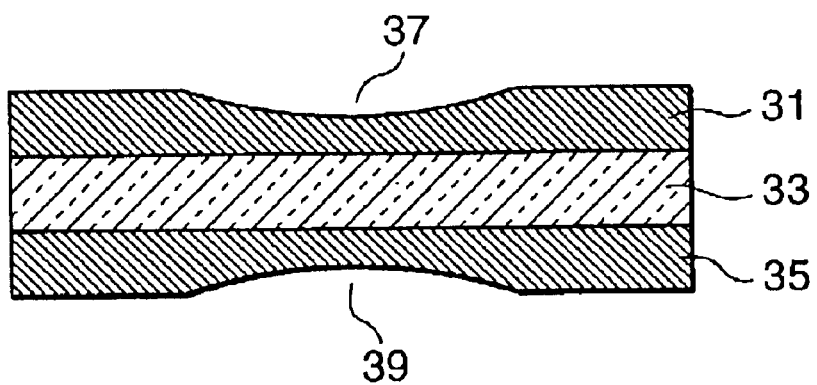

In the embodiment shown in FIGS. 3A–3C, respective Mo/Si multi-layer film 31, 35 are formed on both surfaces of a mirror substrate 33 (FIG. 3A). In FIG. 3B scraping is performed in a region 37 of the first multi-layer film 31 in order to control the reflected wavefront from the surface of the first multi-layer film 31 (i.e, the reflective surface of the mirror). Also, a region 39 of the second multi-layer film 35 on the reverse surface of the substrate 33 is scraped. The region 39 corresponds in location and extend of scraping with the region 37 (FIG. 3C). As the result of this correspondence, the distribution in total stress of the multi-layer film 31 on the obverse surface is canceled by a countervailing stress in the multi-layer film 35 on the reverse surface, thereby preventing deformation of the substrate. By not deforming the substrate, the wavefront reflected from the reflective surface of the mirror is controlled with high accuracy.

Figure 4A:
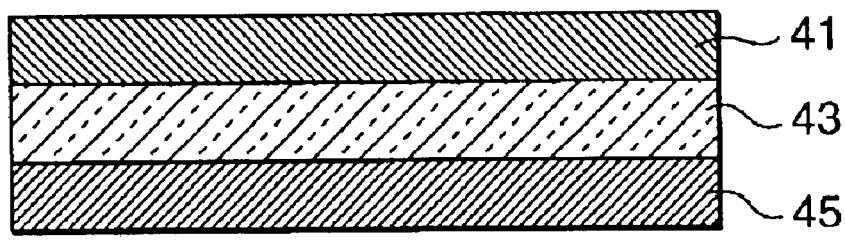
FIGS. 4A–4C are respective elevational sections depicting the results of respective steps in a manufacturing process for a multi-layer-film reflection mirror according to a fourth representative embodiment.
Figure 4B:
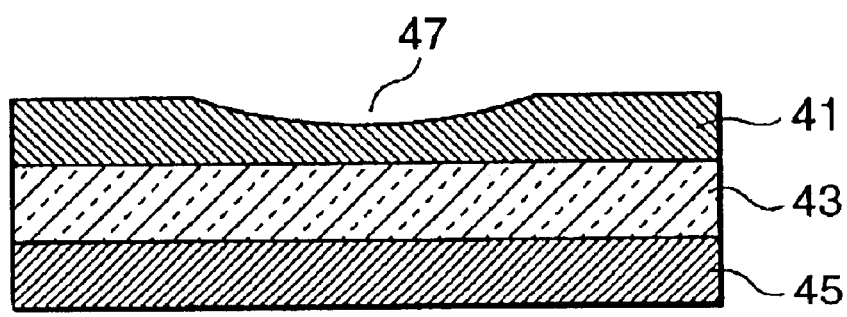
Figure 4C:
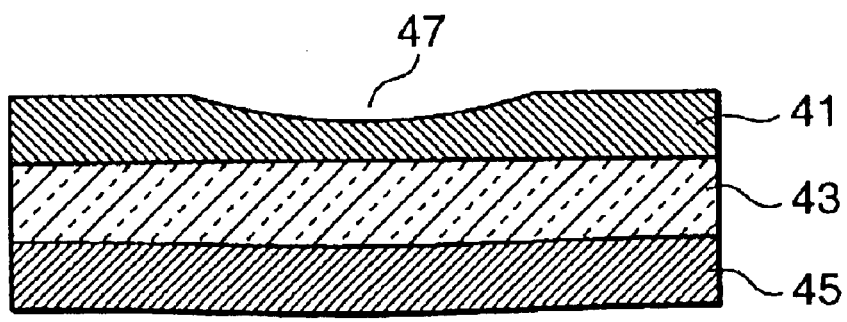

Turning now to FIG. 4, respective Mo/Si multi-layer films 41, 45 are formed on the obverse and reverse surfaces of the mirror substrate 43 (FIG 4A). In FIG. 4B a region 47 of the first multi-layer film 41 is removed by scraping. Based on the overall total-stress effect of deformation of the substrate 43 on the wavefront distribution caused by scraping away the region 47 of the multi-layer film 41, the corresponding amount of the second multi-layer film 41 to be removed by scraping is determined (FIG. 4B). In the case of a Mo/Si multi-layer film, since a part of the substrate 43 where the film 45 to be removed by scraping is reduced compared to a situation in which the substrate does not deform. That is, whenever the region of the substrate corresponding to the scraped region in the first multi-layer film 41 is deformed to concave, the amount of the second multi-layer film 45 to be scraped away is determined based on the phase of a reflected wavefront, from the reflective surface, as modified by substrate deformation. Accordingly, a phase representing a combination of the phase of the reflected wavefront (as modified by the substrate deformation) and the phase of the reflected wavefront (as modified by scraping the region 47 of the multi-layer film 41) is as desired for correction.

In the above-described methods, it is desirable that a layer of a substance containing Si be formed on the reflective surface of the mirror after completing the scraping step. This capping layer prevents oxidation of the reflective surface, which prevents changes in the reflective mirror due to oxidation. Preventing oxidation can be an important part of controlling the reflected wavefront with high accuracy.

EXAMPLE 1

Figure 5:
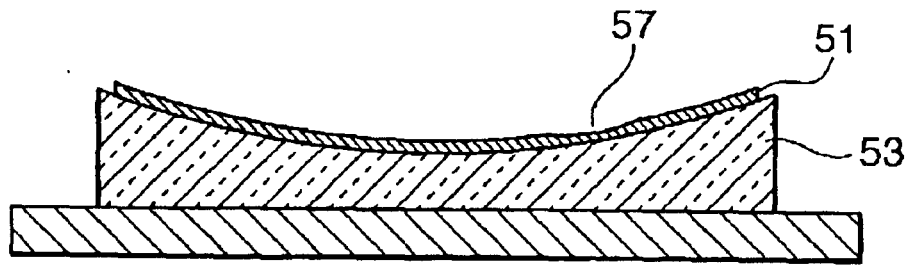
FIG. 5 is an elevational section drawing showing the result of a first example of a manufacturing process for a multi-layer-film reflection mirror.

This example is shown in FIG. 5. A mirror substrate 53 is used that is made of a low-thermal-expansion glassy material. The surface of the substrate 53 is machined to an aspheric profile. A Mo/Ru/Mo/Si multi-layer film 51 is formed on the surface. During formation of the multi-layer film 51, an ion beam is irradiated after forming each Mo layer. The stress of the multi-layer film is +14 MPa or less, which is facilitated by the irradiation of the Mo layers. In this example, irradiation desirably is performed using and argon-ion ($Ar^+$) source, an ion-beam irradiation time of 2 seconds. The stress in the multi-layer film is evaluated by measuring the corresponding deformation of a Si wafer substrate on which an otherwise similar multi-layer film is formed.

The stress measurements reveal that, under the conditions of layer formation used in this example, the stress of the multi-layer film is about $\frac{1}{20}$ the stress of a conventional Mo/Si multi-layer film (the latter normally having an internal compressive stress of −450 MPa). The effect of other variables on deformation of the substrate is determined to be miniscule. Hence, it was possible to confirm substrate deformation by simulations based on finite-element analysis. The accuracy of the shape of the aspheric surface of the substrate after forming the multi-layer film 57 is determined to be 0.5 nm RMS.

The multi-layer film 51 comprises 50 layer pairs formed with a period length d=6.8 nm and Γ=0.35, overlaid with 10 layer pairs formed with a period length d=6.8 nm and Γ=0.1. The layers are formed by ion-beam sputtering. According to the result of measurements of the reflected wavefront, a delay in the reflected wavefront is needed in the region at the right side of the multi-layer film 51. To achieve the desired delay, a corresponding region 57 of the overlying multi-layer film (having Γ=0.1) is scraped away the multi-layer film 51 in the region 57, the shape accuracy of the reflected wavefront is reduced to 0.15 nm RMS. Also, since the Mo/Ru/Mo/Si multi-layer film exhibits very low stress, even if the part of the multi-layer film is scraped off, there is no significant substrate deformation caused by the resulting local perturbation in total stress. Thus, the local scraping of the multi-layer film facilitates highly accurate control of the reflected wavefront. The fact that the Mo/Ru/Mo/Si multi-layer film exhibits a very low stress is confirmed by evaluation of the magnitude of deformation of a wafer substrate caused by forming a Mo/Ru/Mo/Si multi-layer film on the wafer.

In this example, the multi-layer film is scraped using ion-beam irradiation. An exemplary ion-beam irradiation is performed using a source of argon ions ($Ar^+$) from which the argon ions are accelerated by a voltage of 600 V. The ion-current density is 0.5 $mA/cm^2$, and the ion-beam irradiation time is 2 seconds.

In this example, the Mo/Ru/Mo/Si multi-layer film (in which an ion beam is irradiated after forming each Mo layer) is used as a low-stress multi-layer film. However, the possible types of multi-layer film are not limited by this example. Any of various multi-layer films can be used that exhibit high reflectivity to wavelengths ranging from 11 to 14 nm while exhibiting low stress. Desirably, the stress in the multi-layer film (with compressive stress or tensile stress) is 50 MPa or less. If the stress in the multi-layer film is greater than 50 MPa, a deformation component (1 nm or more) remains in the substrate that cannot be canceled effectively by adjusting the distance between mirrors, which could adversely affect EUVL performed using such mirrors.

Also, whereas the multi-layer film is scraped in this example by irradiation using an ion beam, the multi-layer-film scraping method is not limited by this technique. Another possible scraping method is dry-etching or using an abrasive. Either of these alternative techniques, as the ion-beam irradiation method, can be performed to achieve a desired amount of scraping at any location on the multi-layer film.

EXAMPLE 2

Figure 6:
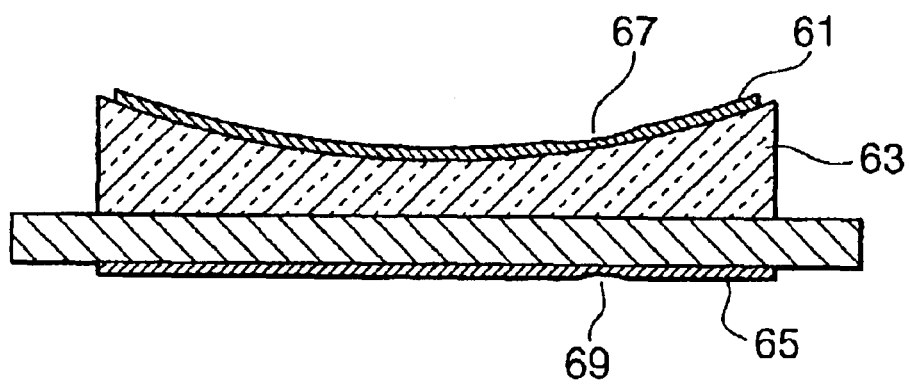
FIG. 6 is an elevational section drawing showing the result of a second example of a manufacturing process for a multi-layer-film reflection mirror.

This example is shown in FIG. 6. A mirror substrate 63 is used that is made of a low-thermal expansion glass, with an aspheric concave obverse surface as well as a reverse surface. Respective Mo/Si multi-layer films 61, 65 are formed on the obverse and reverse surfaces, respectively. The aspheric surface is formed with an accuracy of 0.5 nm RMS. Since the multi-layer films 61, 65 are formed on both surfaces of the substrate 63, the substrate deformation caused by stress in the multi-layer film 61 on the obverse surface in canceled by the stress in the multi-layer film 65 on the reverse surface. As a result the shape accuracy of the substrate is maintained. Each Mo/Si multi-layer film 61, 65 is composed of 50 layer pairs having a period length d=6.8 nm and Γ=0.35, and 10 layer pairs having a period length d=6.8 nm and Γ=0.1. The latter is formed on top of the former. The multi-layer films 61, 65 formed by ion-beam sputtering. According to the results of a wavefront measurement, a correction to the reflected wavefront is required in the right side of the figure. To achieve the correction, the multi-layer film having Γ=0.1 is locally scraped while controlling the amount actually scraped. Removing one or more layers in the region 67 yields a reduction in the reflected wavefront variation to 0.15 nm RMS. However, since the Mo/Si multi-layer film has a compressive stress of −450 MPa, the total stress in the multi-layer film 61 becomes uneven after locally scraping the multi-layer film in the region 67. As a result, the shape of the substrate 63 is different after scrapting than before commencing scraping. To cancel this stress imbalance, scraping is performed in a corresponding region 69 of the multi-layer film 65 on the reverse surface of the substrate 63. I.e., the region 69 corresponds to the region 67. The distribution of film thickness of the scraped multi-layer film 65 on the reverse surface coincides with the distribution of film thickness of the scraped multi-layer film 61 on the obverse surface (the film 61 on the obverse surface represents the reflective surface of the mirror). Accordingly, the perturbation of total stress produced on the reflective surface is canceled with a corresponding perturbation of total stress produced on the reverse surface. As a result, the substrate 63 is not deformed, and the reflected wavefront from the mirror is controlled highly accurate.

In this example, whereas a Mo/Si multi-layer film exhibiting a compressive stress is formed on the reverse surface of the mirror, the multi-layer film on the reverse surface is not limited to a Mo/Si multi-layer film even if the total-stress distribution on the reverse surface is almost the same as the total-stress distribution. on the obverse surface. Also, the film formed on the reverse surface need not be a multi-layer film; alternatively, it can be a single-layer film. Also, whereas in this example a film having a compressive stress is formed on the reverse surface, a film having a tensile stress (e.g. a Mo/Be multi-layer film) alternatively can be used. In the alternative case, the film thickness is controlled in a manner that is opposite the manner in which the film has a compressive stress. Also, scraping of the multi-layer film may start from either the obverse surface of the substrate or the reverse surface of the substrate.

Also whereas in the present example the multi-layer film is formed by ion-beam sputtering, the multi-layer film-forming method is not limited to ion-beam sputtering. An alternative method is magnetron sputtering or vapor deposition.

EXAMPLE 3

Figure 7:
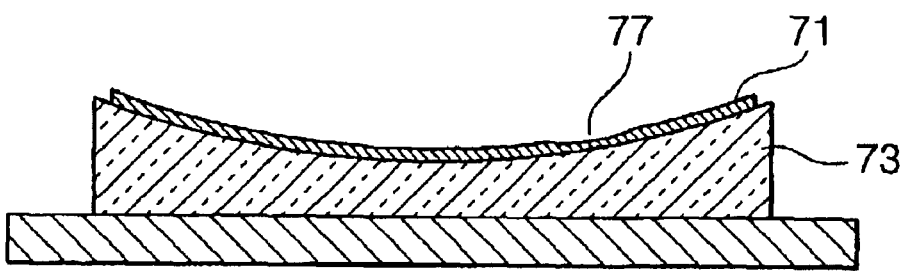
FIG. 7 is an elevational section drawing showing the result of a third example of a manufacturing process for a multi-layer-film reflection mirror.
Figure 8A:
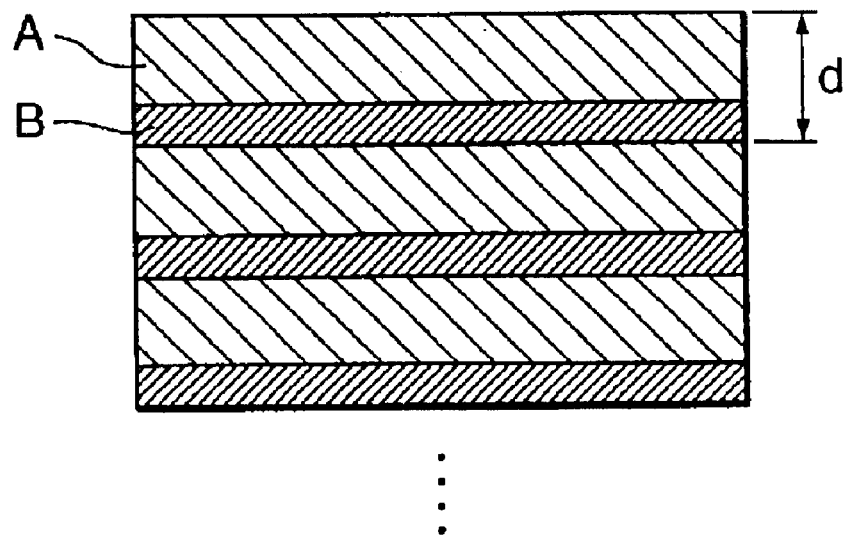
FIGS. 8A–8B are respective elevational sections depicting the general principle of controlling a reflected wavefront by locally scraping a multi-layer film.
Figure 8B:
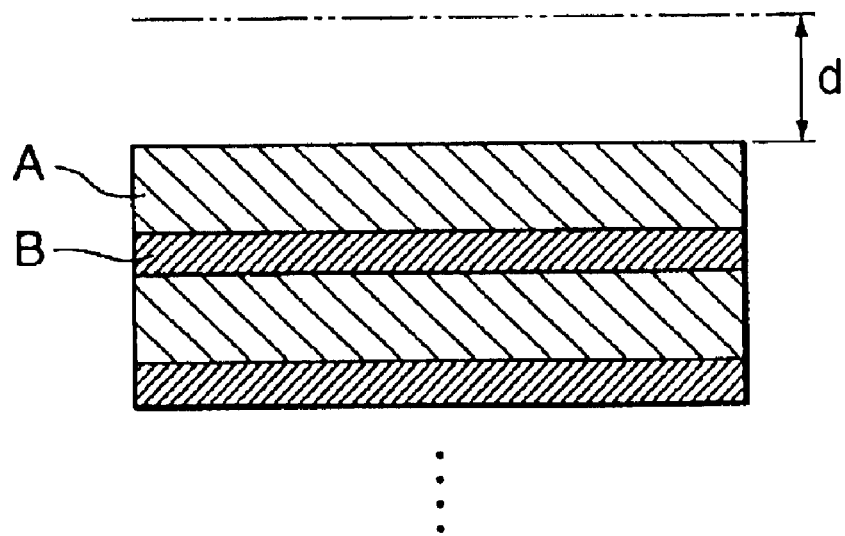

This example is shown in FIG. 7, in which a Mo/Si multi-layer film 71 is formed on an obverse reflective surface of a substrate 73 made of low-thermal-expansion glass. The multi-layer film 71 has the same structure as the multi-layer film 61 of Example 2, and is not described further. According to the result of measurements of the reflected wavefront of light from the reflective surface (surface of the film 71), a delay of 0.6 nm is required in a region 77 located in right-hand side of the figure. To achieve the desired delay, 4 layer pairs are scraped from the region 77. As a result,the optical-path length of EUV light incident to the scraped region 77 is 0.2 nm longer than before scraping. Also, since the reflective light is delayed during both incidence and reflection, the total delay at the region 77 is 0.4 nm. Locally scraping the multi-layer film in the region 77 produces an in-plane distribution of the total stress in the Mo/Si multi-layer film 71. Since the Mo/Si multi-layer film has a compressive stress, a corresponding part of the substrate 73 where the film thereon is scraped is deformed to concave (toward the bottom of the figure). The magnitude of deformation is 0.1 nm in this example. Due to this deformation, the wavefront is delayed at the scraped region 77. Since the delay acts both on incidence and reflection, the total delay is 0.2 nm in this example. Thus by scraping away 4 layer pairs of the multi-layer film in the region 77, the resulting change in optical-path length and the resulting variation in the substrate shape yield the required delay in the wavefront of 0.6 nm, yielding the desired accuracy of the reflected wavefront.

Whereas the invention has been described in connection with multiple representative embodiments and examples, the invention is not limited by those embodiments and examples. On the contrary, the invention is intended to encompass all modifications, alternatives, and equivalents as may be included within the spirit and scope of the invention, as defined by the claims below. Also, any numerical values in the examples and elsewhere are exemplary only and are not intended to be limiting in any way.

As described above, according to the disclosed embodiments and examples, methods for manufacturing a multi-layer film reflection mirror are provided. In the methods, in which at least one layer pair is scraped from a multi-layer film constituting the reflective surface of the multi-layer film mirror so as to correct the shape of a reflected wavefront, consequential substrate deformation caused by local scraping of the multi-layer film having an internal stress can be reduced. As a result, the shape of the wavefront can be corrected with higher accuracy than conventionally, yielding correspondingly improved optical performance.

We claim:

1. A method for manufacturing a multi-layered film reflective mirror, comprising:

depositing, on an obverse surface of a substrate, a multi-layered film comprising superposed layers of at least two types of substances having mutually different respective refractive indices, the layers being superimposed in an alternating manner with a constant period length to form a reflective surface of the mirror;

in a region of the reflective surface requiring phase correction of a wavefront of light reflected from the multi-layered film, locally scraping the multi-layered film in the region to correct the phase; and on a reverse surface of the substrate, depositing a film of a substance that imparts a deformation to the substrate serving to cancel at least a portion of substrate deformation caused by the scraping of the multi-layered film.

2. The method of claim 1, wherein the film deposited on the reverse surface is deposited at least in a region of the reverse surface opposite the region of the reflective surface.

3. The method of claim 1, wherein:

scraping in the region of the reflective surface imparts a corresponding stress to the substrate; and the film deposited on the reverse surface imparts a corresponding stress to the substrate that serves to cancel at least a portion of stress imparted to the substrate by the scraping in the region of the reflective surface.

4. The method of claim 1, wherein the multi-layered film is formed with an internal stress of 50 MPa or less.

5. The method of claim 1, wherein:

the multi-layered film comprises superposed layers of Mo/Ru/Mo/Si; and after forming each Mo layer, the newly formed Mo layer is irradiated using an ion beam.

6. The method of claim 1, wherein the multi-layered film comprises at least one layer comprising Mo and at least one layer comprising Si.

7. The method of claim 1, further comprising a layer of a substance comprising Si on the reflective surface after performing the local scraping of the multi-layered film.

8. A method for manufacturing a multi-layered film reflective mirror, comprising:

forming, on an obverse surface of a substrate, a first multi-layered film comprising superposed layers of at least two types of substances having mutually different respective refractive indices, the layers being superposed in an alternating manner with a constant period length to form a reflective surface of the mirror, in a region of the reflective surface requiring phase correction of a wavefront of light reflected from the multi-layered film, locally scraping the first multi-layered film in the region to correct the phase;

on a reverse surface of the substrate, forming a second multi-layered film having a structure that is substantially similar to the first multi-layered film formed on the obverse surface; and in a region of the second multi-layered film opposite the region of the reflective surface, locally scraping the second multi-layered film to impart a deformation to the substrate serving to cancel at least a portion of substrate deformation caused by the scraping of the multi-layered film.

9. The method of claim 8, wherein in the region of the second multi-layered film in which the second multi-layered film is scraped, the thickness of the second multi-layered film left after scraping is substantially equal to the thickness of the first multi-layered film left after scraping in the region of the first multi-layered film.

10. The method of claim 8, wherein the scraping of the second multi-layered film is sufficient to impart a corresponding stress to the substrate that serves to cancel at least a portion of stress imparted to the substrate by the scraping of the first multi-layered film in the region of the reflective surface.

11. The method of claim 8, wherein an amount of the second multi-layered film removed by scraping is substantially equal to an amount of the first multi-layered film removed by scraping.

12. The method of claim 8, wherein the first multi-layered film comprises at least one layer comprising Mo and at least one layer comprising Si.

13. The method of claim 8, further comprising forming a layer of a substance comprising Si on the reflective surface after performing the local scraping of the first multi-layered film.

14. A method for manufacturing a multi-layered film reflective mirror, comprising:

depositing, on a surface of a substrate, a multi-layered film comprising superposed layers of at least two types of substances having mutually different respective refractive indices, the layers being superposed in an alternating manner with a constant period length to form a reflective surface of the mirror; and in a region of the reflective surface requiring phase correction of a wavefront of light reflected from the multi-layered film, locally scraping the multi-layered film in the region to correct the phase, wherein an amount of the multi-layered film removed by scraping is based on an influence on deformation of the substrate caused by the scraping.

15. The method of claim 14, wherein the multi-layered film comprises at least one layer comprising Mo and at least one layer comprising Si.

16. The method of claim 14, further comprising forming a layer of a substance comprising Si on the reflective surface after performing the local scraping of the multi-layered film.

17. A method for manufacturing a multi-layered film reflective mirror, comprising:

depositing, on a surface of a substrate, a multi-layered film comprising superposed layers of at least two types of substances having mutually different respective refractive indices, the layers being superposed in an alternating manner with a constant period length to form a reflective surface of the mirror; and in a region of the reflective surface requiring phase correction of a wavefront of light reflected from the multi-layered film, locally scraping an amount of the multi-layered film in the region to correct the phase and cause a corresponding deformation of the substrate, wherein the amount of the multi-layered film removed by scraping is determined so that a phase, representing a combination of (i) a phase of the reflected wavefront as modified by the deformation and (ii) a phase of the reflected wavefront as modified by the scraping, is equal to a desired correction amount.

18. The method of claim 17, wherein the multi-layered film comprises at least one layer comprising Mo and at least one layer comprising Si.

19. The method of claim 17, further comprising forming a layer of a substance comprising Si on the reflective surface after performing the local scraping of the multi-layered film.

* * * * *

UNITED STATES PATENT AND TRADEMARK OFFICE
CERTIFICATE OF CORRECTION

PATENT NO. : 6,898,011 B2
APPLICATION NO. : 10/297965
DATED : May 24, 2005
INVENTOR(S) : Kandaka et al.

It is certified that error appears in the above-identified patent and that said Letters Patent is hereby corrected as shown below:

On the title page item (54), and col. 1, line 1,
"MULTI-LAYERED FILM REFLECTOR MANUFACTURING METHOD" should be --METHODS FOR MANUFACTURING MULTI-LAYER-FILM REFLECTION MIRRORS EXHIBITING REDUCED STRESS-RELATED WAVEFRONT ERRORS--.

Column 2,
Lines 1-2, "a synchotrom-radiation" should be --a synchrotron-radiation--.
Line 10, "illuminated" should be --illuminates--.
Line 44, "NA of 0.015" should be --NA of 0.15--.
Line 60, "is a so-called a diffraction-limited" should be --is a so-called diffraction-limited--.

Column 3,
Line 4, "From practical standpoint" should be --From a practical standpoint--.
Line 56, "$d_A=d_B=d.$" should be --$d_A+d_B=d.$--.

Column 4,
Line 9, "Mo is 0,92" should be --Mo is 0.92--.
Line 60, "exceeds 20 nm." should be --exceeds 10 nm.--.
Line 60, "(Here $\Gamma$ is" should be --(Here, $\Gamma$ is--.

Column 5,
Line 23, "multi-layer-film" should be --multi-layer film--.
Line 31, "front surface" should be --front surface.--.
Line 62, "by 0.5 nm," should be --by 0.05 nm,--.

Column 6,
Line 1, "Mo/SI" should be --Mo/SI--.
Line 5, "to the perturbed," should be --to be perturbed,--
Lines 54-55, "multi-layer film" should be --multi-layer-film--.

Column 9,
Line 11, "optical path" should be --optical-path--.
Line 17, "Mo/Ry/Mo/Si" should be --Mo/Ru/Mo/Si--.
Line 27, "is Mo/Si" should be --a Mo/Si--.
Line 59, "extend" should be --extent--.

UNITED STATES PATENT AND TRADEMARK OFFICE
CERTIFICATE OF CORRECTION

PATENT NO. : 6,898,011 B2
APPLICATION NO. : 10/297965
DATED : May 24, 2005
INVENTOR(S) : Kandaka et al.

It is certified that error appears in the above-identified patent and that said Letters Patent is hereby corrected as shown below:

Column 10,
Lines 10-11, "where the film 45 to be removed by scraping is reduced compared" should be --where the film is scraped away is deformed to concave (FIG. 4C), the amount of the multi-layer film 45 to be removed by scraping is reduced compared--.
Line 41, "and argon-ion" should be --an argon-ion--.
Lines 42-43, "source, an ion-beam irradiation time of 2 seconds." should be --source, an ion-acceleration voltage of 600 v, an ion-current density of 0.5 mA/cm$^2$, and an ion-beam irradiation time of 2 seconds.--.
Line 49, "1/20" should be --1/30--.
Line 66, "scraped away from the multi-layer film 51" should be --scraped away while controlling the amount actually scraped. By partially scraping away the multi-layer film 51--.

Column 11,
Lines 36-37, "ion-beam irradiation" should be --ion-beam-irradiation--.
Line 43, "low-thermal expansion" should be --low-thermal-expansion--.
Line 52, "result the" should be --result, the--.
Line 57, "61, 65 formed" should be --61, 65 are formed--.

Column 12,
Line 15, "accurate." should be --accurately.--.
Line 21, "distribution. on the obverse surface." should be --distribution on the obverse surface.--.
Line 47, "in right-hand" should be --in the right-hand--.

Column 13,
Line 22, "multi-layered film" should be --multi-layered-film--.
Line 54, "Mo/Ru/Mo/Si;" should be --Mo/Ru/Mo/Si/. . .;--.
Line 63, "multi-layered film" should be --multi-layered-film--.

UNITED STATES PATENT AND TRADEMARK OFFICE
CERTIFICATE OF CORRECTION

PATENT NO.        : 6,898,011 B2
APPLICATION NO. : 10/297965
DATED             : May 24, 2005
INVENTOR(S)       : Kandaka et al.

It is certified that error appears in the above-identified patent and that said Letters Patent is hereby corrected as shown below:

Column 14,
Line 3, "mirror," should be --mirror;--.
Line 42, "multi-layered film" should be --multi-layered-film--.
Line 63, "multi-layered film" should be --multi-layered-film--.

Signed and Sealed this

Nineteenth Day of February, 2008

JON W. DUDAS
*Director of the United States Patent and Trademark Office*